United States Patent Office 2,766,808
Patented Oct. 16, 1956

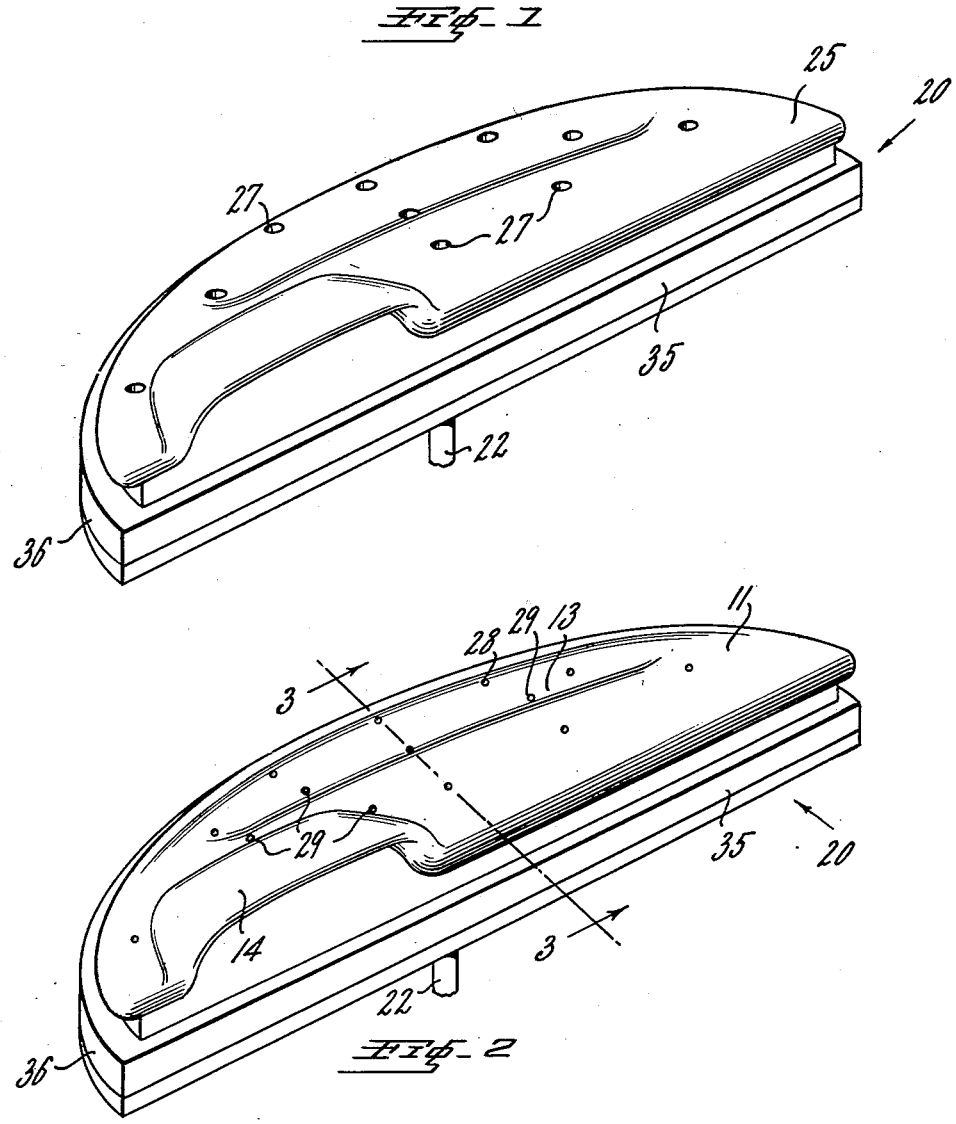

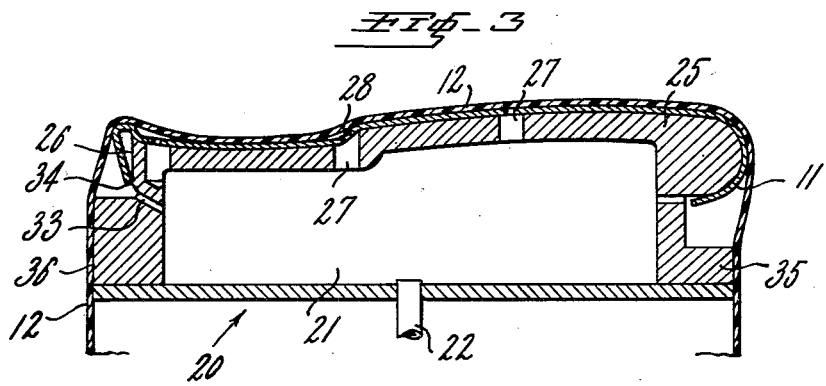
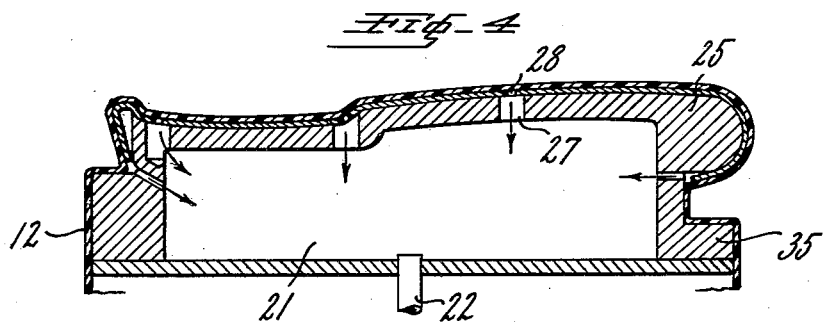
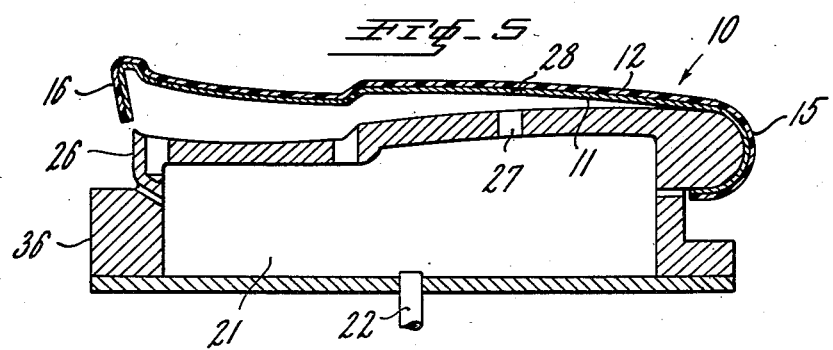
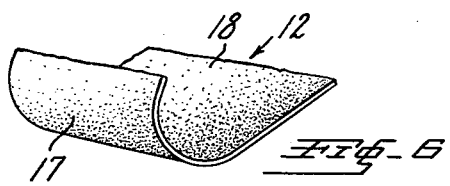

2,766,808

METHOD OF MAKING A SHAPED LAMINATE OF PLASTIC MATERIAL AND BASE MEMBER

Donald J. Kleiber, Chicago, Charles J. Oshinski, Park Ridge, and Judson M. Rogers, Mundelein, Ill., assignors to United States Rubber Company, New York, N. Y., a corporation of New Jersey Application September 15, 1954, Serial No. 456,174

2 Claims. (Cl. 154—41)

This invention relates to a method of making a shaped laminate of plastic material and a base member, and more particularly it relates to a method involving simultaneously laminating a plastic sheet to a rigid base member while shaping the plastic in the form of the base member.

Various object and advantages of the invention will be made manifest in the following detailed description, which is intended to be read with reference to the accompanying drawings, wherein:

Fig. 1 is a form for supporting a shaped base member to which a plastic sheet is to be laminated in accordance with the invention;

Fig. 2 is a similar view showing the base member applied to the form;

Fig. 3 is a transverse sectional view, taken along the line 3—3 of Fig. 2, showing a plastic sheet draped over the assembly of base member and form;

Fig. 4 is a similar view showing the plastic sheet drawn into conformity with the base;

Fig. 5 is a similar view showing the resulting laminate being removed from the form; and, Fig. 6 is a fragmentary perspective view of a portion of the plastic sheet material.

The embodiment of the invention shown in the drawing has to do with the manufacture of plastic covered metal panels, such as are employed as automobile instrument or dash panels. Each panel 10 (Fig. 5) is made up of a rigid sheet metal base 11 united to an outer covering sheet 12 of plastic. The metal sheet or panel base member is typically made of steel and is formed in the desired shape by conventional methods such as stamping and drawing. In the embodiment of the invention shown it is of rather irregular or deeply drawn configuration, having a generally horizontal upper surface characterized by relatively depressed and relatively raised areas 13, 14 (Fig. 2) of departure which provide depressed and raised areas that adapt the panel to the special requirements of its intended end use. The metal base member is usually pre-coated with a suitable rust-preventing primer, in accordance with conventional practice. The laminate has a downwardly extending front portion 15 that curves inwardly toward its lower extremity, as well as a somewhat inwardly directed downwardly extending rear portion 16.

The plastic sheet 12 covering the metal base is typically made of thermoplastic material, composed of a blend comprising a minor proportion (e. g., 30–49 parts) of a synthetic resinous copolymer of butadiene and styrene along with a major proportion (e. g., correspondingly 70–51 parts) of a synthetic rubber of the butadiene-acrylonitrile type as disclosed in U. S. Patent 2,439,202 of L. E. Daly. This basic composition is advantageously modified in practice by adding a plasticizer such as dioctyl phthalate to make the material more workable, and a thermoplastic resin such as polyvinyl chloride to make the material more plastic and somewhat elastic when heated, in amounts about equal to the amount of the styrene-acrylonitrile resin A typical composition is based on the following:

| | Parts |
|---|---|
| Butadiene-acrylonitrile rubber | 29–45 |
| Styrene-acrylonitrile resin | 23–38 |
| Polyvinyl chloride resin | 23–38 |
| Plasticizer | 23–38 |

Reinforcing agents or fillers and pigments or other compounding ingredients may be incuded in the blend. The plastic is initially formed into a flat sheet by calendering or other suitable methods, and at ordinary temperatures it is essentially flexible, but not elastic when cold. In accordance with the invention, the interior surface 17 of the plastic sheet is roughened or grained or slightly ridged before laminating and shaping operation to provide on such surface minute air channels that make possible more effective and complete evacuation of air from between the under surface of the plastic sheet and the outer surface of the metal base during the forming and laminating operation, as will be described in more detail below. Such roughening or graining, or other suitable channeling of the under surface of the plastic sheet is preferably accomplished by pressing the sheet against a suitably engraved metal plate in a platen press at a temperature sufficiently elevated to soften the plastic (e. g., 330 to 350° F.) and impart thereto the surface pattern of the engraved metal plate. At the same time, there may if desired be applied to the outer surface 18 of the plastic sheet a leather-like grain for decorative purposes and to reduce any tendency to produce glare by reflecting light excessively.

The invention involves uniting the pre-formed rigid metal base to the unformed plastic sheet while simultaneously shaping the sheet, with the aid of a form or mold assembly 20 (Fig. 3) which serves as a support and shaping means.

Such forming device 20 is provided with a hollow interior chamber 21, which is adapted to be evacuated with the aid of suitable means (not shown) attached to a vacuum line 22 extending from the lower portion of the forming member. The forming assembly is provided with an upper section 25, the outer surface of which is shaped to correspond essentially to the interior contour of the sheet metal base member of the laminate. To permit the metal base member to be mounted more easily on the form at the start, and to permit the finished laminate to be removed more easily (Fig. 5), the upper rear side surface 26 of the form or mold is cut off somewhat to provide clearance for the relatively undercut descending rear portion 16 of the laminate. A series of relatively large openings 27 (Figs. 1, 3) are provided at suitably spaced intervals in the upper surface of the form for the purpose of placing such surface in communication with the interior vacuum chamber 21. At the start of the process, smaller holes 28 (Figs. 2, 5) are drilled through the upper surface of the metal base sheet 11 at intervals corresponding to the openings in the upper surface of the form, to permit application of the vacuum at the exterior surface of the metal base sheet. Additional small holes 29 (Fig. 2) are provided at the areas of departure 13, 14 for the purpose of insuring that full and effective vacuum will be produced at these areas and there will be no remaining small pockets of air to interfere with proper shaping and firm laminating in these relatively difficult areas.

In practicing the invention, a sheet 12 of the previously prepared plastic is cut to a size somewhat larger than necessary to cover the metal base, and the under surface of the sheet is cleaned with the aid of a suitable solvent such as isoproponal or methylisobutyl ketone. There is then applied to such surface a thin coating of a cement, which is suitably composed of a solution or dispersion of an adhesive based on butadiene-acrylonitrile rubber. The adhesive is suitably of the type known as a heat-activating adhesive, that is, the adhesive becomes receptive and capable of forming a good bond when heated to an elevated temperature. The commercial cement known as EC–776, manufactured by the Minnesota Mining Co., adjusted to an appropriate viscosity with the aid of a suitable solvent such as methylisobutyl ketone, is particularly well adapted for this purpose. This cement is described in that company's technical data sheet entitled "3M Adhesive Formula EC–776" dated February 22, 1950. It is a thin syrup of amber color, weighing 7.2 pounds per gallon, and contains a minimum of approximately 20% solids, such solids representing the cement base, which is a synthetic rubber, believed to be the aforementioned butadiene-acrylonitrile rubber. The solvent in which such base is dissolved to form the EC–776 cement is methylisobutyl ketone. The softening or activating temperature of this cement is about 255° F. As will be understood by those skilled in this art there are other commercially available cements of this general type, based on butadiene-acrylonitrile rubber or other suitable bases. The cement-coated sheet is then dried, suitable at any elevated temperature in an oven, and before undertaking the subsequent laminating step the plastic sheet is preheated to an elevated temperature sufficient to soften the sheet so that it is readily deformable into the desired shape by moderate force, but at the same time is not so soft as to be injured easily or distorted of its own weight. For this purpose the plastic sheet is suitably heated to a temperature of about 200–220° F.

While the plastic sheet is thus being prepared as described, the metal base member 11 is also made ready. The outer surface of the metal base is cleaned with solvent and coated with a cement similar to that applied to the under surface of the plastic sheet. The cement is dried, suitably by heating the metal base in an oven which also serves to activate the cement and preheat the metal panel to a temperature sufficiently high to facilitate forming of a plastic thereagainst. The metal is suitably heated to a temperature some 60° to 100° higher than the temperature to which the plastic sheet was preheated. The metal sheet is typically heated to a temperature of 290° to 300° F., or to a temperature about 30 to 60° higher than the activation temperature of the adhesive. There is thus provided in the metal base member a reserve of heat which insures that when the plastic sheet is subsequently applied to the metal base member, the temperature existing at the interface will be sufficient to effect a good bond, as well as sufficient to render the plastic sheet readily deformable into the desired shape. At the same time, the temperature relationships are such that heating of the plastic sheet to such a temperature that it would be extremely weak, prior to applying it to the metal base member, is avoided.

Fig. 3 indicates the approximate appearance of the assembly when the preheated and cement-coated plastic sheet 12 is initially draped over the similarly cemented and preheated metal base member.

The forming mold 20 is provided, along the lower sides and ends of its upper section 25, with a series of openings or channels 33 (Fig. 3) disposed in proximity to and slightly spaced relationship to the lower peripheral terminal edges 34 of the metal base sheet 11. These openings serve for withdrawal of air from in between the inner surface of the plastic sheet and the outer surface of the metal base at the downwardly extending end or side portions of the assembly. In order to make possible the effective establishment of vacuum in these areas provision is made for sealing of the excess draped length of the plastic sheet against the sides of the mold. Such provision takes the form of outwardly extending portions 35, 36 at the front and rear sides of the mold assembly below the lower vacuum openings 33. The arrangement is such that when vacuum is applied to the interior chamber 21, and the limp preheated plastic sheet is urged inwardly by hand against edges of the prominent lower sides 35, 36 of the forming member, there is then established through the channels 33, an area of reduced pressure between the inner surface of the downwardly draped portion of plastic sheet and the outer surface of the downwardly extending sides and ends of the metal base member, with the result that the plastic sheet is urged by the outside pressure of the atmosphere into intimate contact with the sides of the meal base member. At the same time, vacuum is similarly established, through the medium of the channels 27 and holes 28, between the under surface of the upper portion of the plastic sheet and the outer surface of the upper portion of the metal base member. Complete and effective application of vacuum over the entire under surface of the plastic sheet is insured because the graining or embossing 17 provided on the under surface of the plastic sheet for this purpose permits all of the air to be withdrawn from between the contacting surfaces of the plastic sheet and metal base. By this arrangement, the pressure of the atmosphere serves to press the plastic sheet firmly against the metal base member, and since the adhesive coatings on the contacting faces of these two members are at this time heated above the activating temperature, by reason of the fact that the metal base member was initially preheated to a temperature substantially in excess of the activation temperature, these two members become firmly united. At the same time, the preheated plastic sheet which receives additional heat from the metal base member having an even higher temperature, attains a temperature at this stage such that it is extremely readily deformable, and therefore the pressure of the atmosphere is more than sufficient to shape the sheet to conform it exactly to the various curved and raised or depressed surface areas of the metal base member.

The assembly is permitted to remain thus under vacuum until the laminate has cooled at least to a temperature below the activating temperature of the cement, so that the assembly is essentially fixed or set with the parts firmly adhered in their proper relative positions. Thereafter, the excess material may be trimmed with the aid of a knife around the peripheral edge of the metal base member, and the assembly removed from the form as indicated in Fig. 5.

Having thus described our invention, what we claim and desire to protect by Letters Patent is:

1. A method of simultaneously shaping a plastic sheet comprised of a blend of a major proportion of a rubbery copolymer of butadiene and acrylonitrile and a minor proportion of a resinous copolymer of styrene and acrylonitrile and laminating the said plastic sheet to a surface of a sheet metal base of irregular configuration comprising in combination the steps of providing air holes at spaced intervals through the sheet metal base for application of vacuum, impressing surface air channels on a surface of the plastic sheet which is to face and be united to the metal base for effective application of vacuum over the whole of such surface, preheating the plastic sheet to a temperature of 200 to 220° F., which temperature is sufficient to render the plastic sheet readily deformable by application of moderate force but insufficient to be injured easily, preheating the said sheet metal base to a temperature 60° to 100° F. higher than the temperature of the plastic sheet, draping the plastic sheet over the sheet metal base with a coating of an additional material which is an adhesive having a heat activating temperature 30° to 60° lower than the said temperature of the sheet metal base disposed between the sheet and the base, with the said surface of the plastic sheet bearing said air channels facing the metal base evacuating the air from between the sheet metal base and the plastic sheet through the said air holes and channels, whereby the plastic sheet is urged by the pressure of the atmosphere against the said base and takes the shape of the base and becomes adhered thereto.

2. A method of simultaneously shaping a plastic sheet and laminating it to a sheet metal base having a generally irregular shape including an upper surface and downwardly extending side portions, comprising in combination the steps of providing air holes at spaced intervals passing through the said upper surface of the sheet metal base, providing a mold form having an upper supporting surface corresponding to the said surface of the sheet metal base and containing corresponding holes for application of vacuum and having additional vacuum-applying holes at the sides in proximity to the lower side edges of the said sheet metal base when the base is disposed on the form, impressing surface air channels on an under surface of the plastic sheet which is to face and be united to the sheet metal base, coating the said under surface of the plastic sheet and the upper surface of the sheet metal base with an additional material which is an adhesive having a heat activating temperature of about 255° F., preheating the sheet metal base to a temperature of 290° to 300° F., preheating the plastic sheet to a temperature of 200° to 220° F. which temperature is sufficient to render the plastic sheet readily deformable by application of moderate force but insufficient to be injured easily, draping the plastic sheet over the sheet metal base while the latter is supported on the said mold form, applying vacuum to the said holes in the form, urging the edges of the plastic sheet by hand into contact with the mold form along a line below the said additional holes in proximity to the lower edges of the metal base, whereby air is evacuated from between the plastic sheet and the sheet metal base and the pressure of the atmosphere shapes the plastic sheet into conformity with the sheet metal base, and maintaining said vacuum until the assembly is cooled below the heat activating temperature of the adhesive, whereby the plastic sheet is firmly laminated to the sheet metal base.

References Cited in the file of this patent

UNITED STATES PATENTS

| | | |
|---|---|---|
| 1,856,694 | De Correvont | May 3, 1932 |
| 1,980,022 | Whitehouse | Nov. 6, 1934 |
| 2,343,225 | Pray et al. | Feb. 29, 1944 |
| 2,439,202 | Daly | Apr. 6, 1948 |
| 2,590,221 | Stevens | Mar. 25, 1952 |
| 2,614,059 | Cooper | Oct. 14, 1952 |
| 2,617,126 | Nebesar | Nov. 11, 1952 |
| 2,671,493 | Olson | Mar. 9, 1954 |

FOREIGN PATENTS

| | | |
|---|---|---|
| 627,195 | Great Britain | Aug. 2, 1949 |